US011436441B2

(12) United States Patent
Tan et al.

(10) Patent No.: US 11,436,441 B2
(45) Date of Patent: Sep. 6, 2022

(54) SYSTEMS AND METHODS FOR TRAINING A MACHINE LEARNED MODEL FOR AGENT NAVIGATION

(71) Applicant: Google LLC, Mountain View, CA (US)

(72) Inventors: Jie Tan, Mountain View, CA (US); Sehoon Ha, Atlanta, GA (US); Tingnan Zhang, Sunnyvale, CA (US); Xinlei Pan, Berkeley, CA (US); Brian Andrew Ichter, San Francisco, CA (US); Aleksandra Faust, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 246 days.

(21) Appl. No.: 16/717,471

(22) Filed: Dec. 17, 2019

(65) Prior Publication Data

US 2021/0182620 A1 Jun. 17, 2021

(51) Int. Cl.
| | |
|---|---|
| *G06K 9/00* | (2022.01) |
| *G06K 9/62* | (2022.01) |
| *G06N 3/04* | (2006.01) |
| *G06N 3/08* | (2006.01) |
| *G05D 1/00* | (2006.01) |

(52) U.S. Cl.
CPC ......... *G06K 9/6262* (2013.01); *G05D 1/0088* (2013.01); *G06K 9/6261* (2013.01); *G06N 3/04* (2013.01); *G06N 3/08* (2013.01)

(58) Field of Classification Search
CPC ............... G06K 9/6262; G06K 9/6261; G06K 9/00664; G06K 9/6273; G06N 3/04; G06N 3/08; G05D 1/0088
See application file for complete search history.

(56) References Cited

U.S. PATENT DOCUMENTS

2020/0353943 A1* 11/2020 Siddiqui .............. G05B 13/027

OTHER PUBLICATIONS

Anguelov, et al, "Google Street View: Capturing the World at Street Level", Computer, Jun. 2010, pp. 32-38.
Bonin-Font et al, "Visual Navigation for Mobile Robots: A Survey", Journal of Intelligent and Robotic Systems, vol. 53, No. 3, 2008, 26 pages.

(Continued)

*Primary Examiner* — Dhaval V Patel
(74) *Attorney, Agent, or Firm* — Dority & Manning, P.A.

(57) ABSTRACT

A computer-implemented method is disclosed for training one or more machine-learned models. The method can include inputting a first image frame and a second image frame into a feature disentanglement model and receiving, as an output of the machine-learned feature disentanglement model, a state feature and a perspective feature. The method can include inputting the state feature and the perspective feature into a machine-learned decoder model and receiving, as an output of the machine-learned decoder model, the reconstructed image frame. The method can include comparing the reconstructed image frame with a third image frame corresponding with the location and the perspective orientation. The method can include adjusting one or more parameters of the machine-learned feature disentanglement model based on the comparison of the reconstructed image frame and the third image frame.

24 Claims, 8 Drawing Sheets

(56) References Cited

OTHER PUBLICATIONS

Chiang et al, "Learning Navigation Behaviors End-to-End with AutoRL", Robotics and Automation Letters, vol. 4, No. 2, Apr. 2019, pp. 2007-2014.
Codevilla et al, "End-to-End Driving via Conditional Imitation Learning", arXiv:1710v2, Mar. 2, 2018, 8 pages.
Coumans et al, "Pybullet, a Python Module for Physica Simulation for Games, Robotics and Machine Learning", GitHub repository, 2016, 5 pages.
Dijkstra, "A Note on Two Problems in Connexion with Graphs", Numerische Mathematik 1, 1959, pp. 269-271.
Fang et al., "Scene Memory Transformer for Embodied Agents in Long-Horizon Tasks", arXiv:1903v1, Mar. 9, 2019, 15 pages.
Francis et al, "Long-Range Indoor Navigation with PRM-RL", arXiv:1902v2, Feb. 22, 2020, 21 pages.
Fu et al, "From Language to Goals: Inverse Reinforcement Learning for Vision-Based Instruction Following," arXiv:1902v1, Feb. 20, 2019, 14 pages.
Gupta et al, "Cognitive Mapping and Planning for Visual Navigation", arXiv:1702v3, Feb. 7, 2019, 19 pages.
He et al, "Deep Residual Learning for Image Recognition," arXiv:1512v1, Dec. 10, 2015, 12 pages.
Huber, "Robust Estimation of a Location Parameter", The Annals of Mathematical Statistics, vol. 35, No. 1, 1964, pp. 73-101.
Kerl et al, "Dense Visual Slam for RGB-D Cameras", Conference on Intelligent Robots and Systems, Nov. 3-7, 2013, Tokyo, Japan, 7 pages.
Kingma et al, "Adam: A Method for Stochastic Optimization", arXiv:1412v9, Jan. 30, 2017, 15 pages.
Konolige et al, "View-Based Maps", International Journal of Robotics Research, vol. 29, No. 8, 2010, 8 pages.
Kumar et al, "Learning Navigation Subroutines by Watching Videos", arXiv:1905v1, May 29, 2019, 12 pages.
Lenz et al, "DeepMPC: Learning Deep Latent Features for Model Predictive Control", Robotics: Science and Systems, 9 pages.
Liu et al, "Imitation from Observation: Learning to Imitate Behaviors from Raw Video via Context Translation", arXiv:1707v2, Jun. 18, 2018, 8 pages.
Pan et al, "Semantic Predictive Control for Explainable and Efficient Policy Learning", Conference on Robotics and Automation, 2019, 9 pages.
Pan et al, "Agile Autonomous Driving Using End-to-End Deep Imitation Learning", Robotics: Science and Systems, Jun. 26-30, 2018, Pittsburgh, Pennsylvania, 10 pages.
Pathak et al., "Zero-Shot Visual Imitation", arXiv:1804v1, Apr. 23, 2018, 16 pages.
Ramachandran et al, "Swish: A Self-Gated Activation Function", arXiv:1710v2, Oct. 27, 2017, 13 pages.
Rhinehart et al "Deep Imitative Models for Flexible Inference, Planning, and Control", arXiv:1810v4, Oct. 1, 2019, 19 pages.
Sermanet et al, "Time-Contrastive Networks: Self-Supervised Learning from Video", arXiv:1704v3, Mar. 20, 2018, 15 pages.

* cited by examiner

SYSTEMS AND METHODS FOR TRAINING A MACHINE LEARNED MODEL FOR AGENT NAVIGATION

FIELD

The present disclosure relates generally to machine-learning. More particularly, the present disclosure relates to training one or more machine learned models to generate a navigation policy for an agent, such as a robot.

BACKGROUND

Imitation learning has been used to learn visual navigation policies. However, for training agents using data collected with agents having different perspectives and/or dynamics can be challenging. For instance, collecting expert demonstration data for legged robots is challenging as these robotic systems can be hard to control, move slowly. Such robots also generally cannot operate continuously for long periods of time.

SUMMARY

Aspects and advantages of embodiments of the present disclosure will be set forth in part in the following description, or can be learned from the description, or can be learned through practice of the embodiments.

Aspects of the present disclosure are directed to a computer-implemented method for training one or more machine-learned models. The method can include inputting, by one or more computing devices, a first image frame and a second image frame into a feature disentanglement model that is configured to receive the first image frame and the second image frame, and in response to receipt of the first image frame and the second image frame, generate a state feature and a perspective feature, the state feature describing a location with respect to the first image frame, the perspective feature describing a perspective orientation with respect to the second image frame. The method can include receiving, by the one or more computing devices and as an output of the machine-learned feature disentanglement model, the state feature and the perspective feature. The method can include inputting, by the one or more computing device, the state feature and the perspective feature into a machine-learned decoder model that is configured to receive the state feature and the perspective feature, and in response to receipt of the state feature and perspective feature, output a reconstructed image frame corresponding to the location with respect to the first image frame that is described by the state feature and corresponding to the perspective orientation with respect to the second image frame that is described by the perspective feature. The method can include receiving, by the one or more computing devices and as an output of the machine-learned decoder model, the reconstructed image frame. The method can include comparing, by the one or more computing device, the reconstructed image frame with a third image frame corresponding with the location and the perspective orientation. The method can include adjusting, by the one or more computing device, one or more parameters of the machine-learned feature disentanglement model based on the comparison of the reconstructed image frame and the third image frame.

Another aspect of the present disclosure is directed to a computing system for training one or more machine-learned models. The computing system can include a feature disentanglement model that is configured to receive a first image frame and a second image frame, and in response to receipt of the first image frame and the second image frame, generate a state feature and a perspective feature. The state feature can describe a location with respect to the first image frame. The perspective feature can describe a perspective orientation with respect to the second image frame. The computing system can include at least one processor and at least one tangible, non-transitory computer-readable medium that stores instructions that, when executed by the at least one processor, cause the at least one processor to perform operations. The operations can include inputting the first image frame and the second image frame into the feature disentanglement model and receiving, as an output of the machine-learned feature disentanglement model, the state feature and the perspective feature. The operations can include inputting the state feature and the perspective feature into the machine-learned decoder model that is configured to receive the state feature and the perspective feature, and in response to receipt of the state feature and perspective feature, output a reconstructed image frame corresponding to the location with respect to the first image frame that is described by the state feature and corresponding to the perspective orientation with respect to the second image frame that is described by the perspective feature. The operations can include receiving, as an output of the machine-learned decoder model, the reconstructed image frame. The operations can include comparing, by the one or more computing device, the reconstructed image frame with a third image frame corresponding with the location and the perspective orientation. The operations can include adjusting, by the one or more computing device, one or more parameters of the machine-learned feature disentanglement model based on the comparison of the reconstructed image frame and the third image frame.

Another aspect of the present disclosure is directed to a computing system including a machine-learned state feature extractor model that is configured to receive an initial image frame and a goal image frame, and, in response to receipt of the initial image frame and the goal image frame, generate an initial state feature and a goal state feature. The initial state feature can describe an initial location at an initial vantage point of the initial image frame with respect to an environment, and the goal state feature can describe a goal location at a goal vantage point of the goal image frame with respect to the environment. The computing system can include at least one processor and at least one tangible, non-transitory computer-readable medium that stores instructions that, when executed by the at least one processor, cause the at least one processor to perform operations. The operations can include inputting the initial image frame and the goal image frame into the machine-learned state feature extractor model and receiving, as an output of the machine-learned state feature extractor model, the initial state feature that describes the initial location and the goal state feature that describes the goal location.

Another aspect of the present disclosure is directed to a computing system including a feature disentanglement model configured to extract perspective-invariant state features from on a first set of training images having a first perspective and a second set of training images having a second perspective. The computing system can include at least one processor and at least one tangible, non-transitory computer-readable medium that stores instructions that, when executed by the at least one processor, cause the at least one processor to perform operations. The operations can include obtaining the first set of training images and the second set of training images. The first set of training images can be sequentially collected by a first camera affixed to a first agent as the first agent traversed a trajectory. The second set of training images ca be sequentially collected by a second camera affixed to the first agent as the first agent traversed the trajectory. The operations can include using the feature disentanglement model to extract, from the first set of training images and second set of training images, the perspective-invariant state features that describe the trajectory and performing imitation learning using the perspective-invariant state features to train a second agent having a visual perspective that is different than a first visual perspective of the first set of training images and different than a second visual perspective of the second set of training images.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
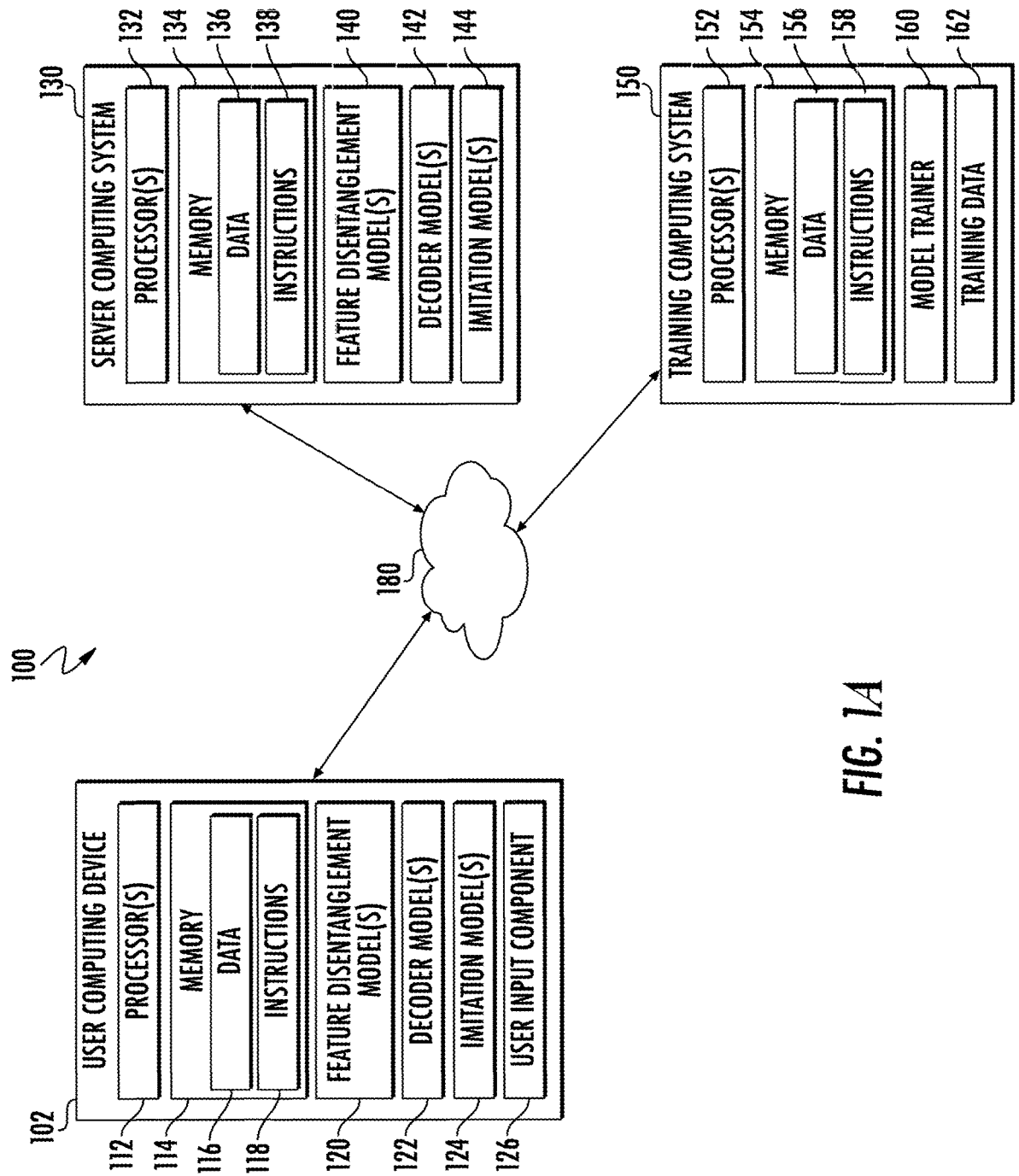
FIG. 1A depicts a block diagram of an example computing system for training a machine learned model for agent navigation according to example embodiments of the present disclosure.

Reference numerals that are repeated across plural figures are intended to identify the same features in various implementations.

DETAILED DESCRIPTION

Overview

Generally, the present disclosure is directed to systems and methods for training machine learned models. A navigation policy can be learned for an agent based on training data collected for an expert that has different perspectives and/or different dynamics than the agent. For example, a legged robot agent can be trained based on training data that describes an expert demonstration by a human or human-operated robot having a different sensor perspective (e.g., camera height from a ground surface, camera orientation, etc.) than the legged robot. As another example, training data that describes an expert demonstration by a wheeled vehicle (e.g., human-operated wheeled vehicle, autonomous wheeled vehicle, etc.) can be used to train a flying vehicle (e.g., autonomous drone). However, it should be understood that the present system and methods can find application with training one agent based on training data collected by another agent (e.g., expert), which can have a different perspective and/or different dynamics than the first agent.

According to aspects of the present disclosure, a feature disentanglement model can be configured to extract perspective-invariant state features from sequential training images collected from two or more different perspectives as an agent traverses a trajectory. Two or more cameras can be affixed to an expert and used to collect images of differing perspectives as the expert travels along a trajectory. More specifically, a first set of training images can be sequentially collected by a first camera affixed to a first agent (e.g., the expert) as the first agent traverses a trajectory. A second set of training images can be sequentially collected by a second camera affixed to the first agent as the first agent traversed the trajectory.

The computing system can be configured to use the feature disentanglement model to extract perspective-invariant state features from the first set and second set of training images. The perspective-invariant state features can describe the trajectory. For example, the perspective-invariant state features can describe respective time-based locations and/or orientations of the first actor along the trajectory with respect to an environment of the first actor.

The computing system can be configured to perform imitation learning using the perspective-invariant state features to train a second agent having a visual perspective that is different than a first visual perspective of the first set of training images and different than a second visual perspective of the second set of training images. For example, the second agent can be configured to collect image frames from a third camera that has a different perspective than each of the first and second cameras. The third camera can be affixed to the second agent such that the third camera is generally located at a height from the ground that is different than the first and second cameras. The third camera can also have a different orientation (e.g., vertical tilt) than the first and second cameras.

According to aspects of the present disclosure, a feature disentanglement model and a decoder model can be trained in an autoencoder configuration in a first training stage. The feature disentanglement model can be used to train an initiation learning model to generate a navigation policy in a second training stage after the first training stage. Referring to the first training stage, the feature disentanglement model can be trained to generate perspective-invariant state features that describe location information and perspective features that describe perspective information based on image frames describing an expert navigating an environment. For instance, the image frames can be captured by multiple cameras affixed to the expert such that the image frames having differing perspectives and/or vantage points. The decoder model can be configured to generate a reconstructed image based on the perspective-invariant state features and perspective features. The feature disentanglement model and/or decoder model can be trained based on a comparison of the reconstructed image with a ground truth image. In a second training stage, the feature disentanglement model can be used to train an imitation learning model to generate a navigation policy for an agent in response to receiving input data, such as state features describing locations within an environment. The navigation policy can describe actions for the agent to navigate the environment along a trajectory previously navigated by the expert.

More specifically, a computer-implemented method can include inputting a first image frame and a second image frame into the feature disentanglement model. The feature disentanglement model can be configured to receive the first image frame and the second image frame, and in response to receipt of the first image frame and the second image frame, generate a state feature and a perspective feature. The state feature can be described as perspective-invariant. For example, the state feature can describe a location and/or an orientation with respect to the first image frame (e.g., of a vantage point of the first image frame). The state feature can be free of perspective information with respect to the vantage point of the first image frame. The location and/or orientation of the first image frame can include a relative location of a vantage point of the first image frame with respect to an environment.

The perspective feature can describe a perspective orientation with respect to the second image frame. The perspective orientation can include a height and/or pitch of the vantage point of the second image frame. The perspective feature can be free of location information with respect to the vantage point of the second image frame. Thus, the feature disentanglement model can be described as disentangling location information (described by the state feature) with perspective information (described by the perspective feature).

The computer-implemented method can include receiving, as an output of the machine-learned feature disentanglement model, the state feature and the perspective feature and inputting the state feature and the perspective feature into a machine-learned decoder model. The machine-learned decoder model can be configured to receive the state feature and the perspective feature, and in response to receipt of the state feature and perspective feature, output a reconstructed image frame. The reconstructed image frame can correspond with the location of the first image frame (as described by the state feature) and perspective orientation of the second image frame (as described by the perspective feature). Thus, the machine-learned decoder model can reconstruct the reconstructed image frame based on the state feature and perspective feature that are output by the machine-learned feature disentanglement model.

The computer-implemented method can include comparing the reconstructed image frame with a third image frame corresponding with the location and the perspective orientation. The third image frame can be captured at the location and with the perspective orientation of the reconstructed image frame. The computer-implemented method can include adjusting one or more parameters of the machine-learned feature disentanglement model based on the comparison of the reconstructed image frame and the third image frame. Thus, the machine-learned feature disentanglement model and/or machine-learned decoder model.

In some embodiments, the machine-learned feature disentanglement model can include a state feature extractor model and a perspective feature extractor model. The state feature model can be configured to generate the state fea-tures, and the perspective feature extractor model can be configured to generate the perspective features. The method can include inputting the first image frame into the state feature extractor model and inputting the second image into the perspective feature extractor model. The first image frame can be selected from a first series of sequential image frames that correspond with a first relative location with respect to a trajectory of an actor. For example, the first series of sequential image frames can be captured from a first camera affixed to the actor (e.g., "expert") while the actor traverses the trajectory. The second image frame can be selected from a second series of sequential image frames such that the second image frame is temporally aligned with the first image frame. The second sequential series of image frames can correspond with a second relative location with respect to the trajectory of the actor. For example, the second sequential series of image frames can be captured from a second camera affixed to the actor at a different location on the actor while the actor traverses the trajectory. In other words, the first and second image frames can be captured at the same time along the trajectory of the actor yet from different cameras (and thus with different vantage points and perspectives).

In some implementations, the method can include selecting the third image frame from a third series of sequential image frames such that the third image frame is temporally spaced apart from the first image frame and the second image frame. The third sequential series of image frames can correspond with a third relative location with respect to the trajectory of the actor. For example, the third image frame can be captured from the first camera or second camera but at a different time than the first image frame or second image frame.

In some implementations, the method can include inputting the first sequential series of image frames and the second sequential series of image frames into the machine-learned feature disentanglement model. The first sequential series of image frames can correspond with a first relative location (e.g., vantage point, affixed location on the expert, etc.) with respect to a trajectory of an actor. The second sequential series of image frames can correspond with a second relative location (e.g., vantage point, affixed location on the expert, etc.) with respect to the trajectory of the actor. The method can include receiving, as an output of the machine-learned feature disentanglement model, a plurality of state features that describe respective locations with respect to trajectory of the actor. For instance, the plurality of state features can describe the trajectory with respect to an environment of the actor.

In some implementations, an imitation learning model can be trained to generate a navigation policy for an agent in response to receiving input data, such as state features describing locations within an environment, for example in a second training stage after a first training stage in which the feature disentanglement model was trained in an autoencoder configuration with a decoder model. The imitation learning model can be trained using the state features output by the feature disentanglement model in response to receiving training image frames having a perspective that is different than the perspective of the agent. The navigation policy can describe actions for the agent to navigate the environment along a trajectory previously navigated by the expert, for example as described by the training image frames.

For example, the method can include inputting the plurality of state features into the machine-learned imitation model. The machine-learned imitation model can be configured to receive the plurality of state features, and in response to receipt of the plurality of state features, output an action sequence that describes a series of actions for another actor to follow the trajectory of the actor (e.g., expert). The method can include receiving, as an output of the machine-learned feature disentanglement model, a plurality of state features that describe respective locations with respect to the trajectory of the actor.

The machine-learned imitation model can be trained based on a comparison of the action sequence output by the machine-learned imitation model with a ground truth action sequence of the actor. The ground truth action sequence of the actor can correspond with instructions followed by the actor (e.g., expert) to traverse the trajectory. For instance, the ground truth action sequence can include instructions such as forward, turn left, turn right, stop, and so forth. The method can include adjusting one or more parameters of the machine-learned imitation model based on the action sequence output by the machine-learned imitation model with the ground truth action sequence. Thus, the machine-learned imitation model can be trained to generate an action sequence for another actor to follow to traverse the trajectory of the expert In some implementations, the systems and methods described herein can be applied to robot visual navigation. Robot visual navigation is a fundamental task for mobile robots, such as legged robots. Traditional approaches can be ineffective where the robot has to learn from demonstrations having different perspectives and dynamics (e.g., by an expert and/or human). Imitation learning can be used to learn a navigation policy given labeled expert trajectories, such as imitating a target driven navigation policy and conditional imitation learning.

For example, a visual navigation policy for a legged robot can be learned from human demonstrations. A human expert can provide navigation demonstrations as videos are recorded by multiple body-mounted cameras. Relevant state features can be extracted from temporally-aligned multi-perspective videos by training a feature disentanglement model. The feature disentanglement model can be configured to disentangle state related features from perspective related features. The feature disentanglement model can achieve such disentanglement by training with a proposed cycle-loss. The disentangled features can be used to generate images with correspondence to the features. Labeling for the demonstrations for robot-compatible actions can be achieved either manually with an efficient human labelling GUI and/or using a learned inverse dynamics model. A model-based imitation learning approach can be used for training a visual navigation policy in the learned latent feature space.

Learning from demonstrations or imitation learning is an effective approach to learn robot navigation policies from labeled data. The labeled data can be obtained from an on-robot demonstration such as imitating autonomous driving policy, from human observation such as third-person imitation learning, and/or from learning by translating context and using time-contrastive network (TCN) to learn a reward function. Though learning with on-robot data is effective, it is can be labor intensive to collect large scale datasets for many robots, and some may require special training to use. Learning from human demonstrations of different contexts (perspectives) is natural to mimic the way human learns to behave, as children learn to perform locomotion and many control tasks by watching others (experts) perform the task. However, the perspective shift between a human and robot is non-trivial. A feature extraction framework can be used to solve this problem. The model learning and planning can be performed in a learned feature space, rather than in a raw pixel space.

The systems and methods of the present disclosure can provide a number of technical effects and benefits. For example, machine-learned models can be more efficiently trained to navigate autonomous vehicles and robots in new environments. Additionally, such training can be performed using visual data collected from entities (e.g., vehicles, robots, etc.) having disparate perspectives and/or dynamics. As such, the amount of storage required for storing such training data and/or bandwidth for transmitting such data can be reduced.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 for training a machine-learned feature disentanglement model 120 according to example embodiments of the present disclosure. The system 100 can include a user computing device 102, a server computing system 130, and/or a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more feature disentanglement models 120, decoder models 122, and/or imitation models 124. For example, the feature disentanglement models 120, decoder models 122, and/or imitation models 124 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. An example feature disentanglement model 120 and decoder model 122 are discussed with reference to FIG. 2. An example disentanglement model 120 and imitation model 124 are discussed with reference to FIG. 3. An example imitation model 124 is discussed with reference to FIG. 4.

In some implementations, the one or more feature disentanglement models 120, decoder models 122, and/or imitation models 124 can be received from the server computing system 130 over network 180, stored in the user computing device memory 114, and the used or otherwise implemented by the one or more processors 112. In some implementations, the user computing device 102 can implement multiple parallel instances of the feature disentanglement model(s) 120, the decoder model(s) 122, and/or imitation model(s) 124 (e.g., to perform parallel operations across multiple instances of the models 120, 122, 124).

Additionally or alternatively, one or more feature disentanglement models 140, decoder models 142, and/or imitation models 144 can be included in or otherwise stored and implemented by the server computing system 130 that communicates with the user computing device 102 according to a client-server relationship. For example, the feature disentanglement models 140, decoder models 142, and/or imitation models 144 can be implemented by the server computing system 140 as a portion of a web service (e.g., a model-training service). Thus, one or more models 120, 122, 124 can be stored and implemented at the user computing device 102 and/or one or more models 140, 142, 144 can be stored and implemented at the server computing system 130.

The user computing device 102 can also include one or more user input component 126 that receives user input. For example, the user input component 126 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned models 140, 142, 144. For example, the models 140, 142, 144 can be or can otherwise include various machine-learned models such as neural networks (e.g., deep recurrent neural networks) or other multi-layer non-linear models. Example models 140, 142, 144 are discussed with reference to FIGS. 2 through 4.

The server computing system 130 can train the models 140, 142, 144 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the model 140, 142, 144 based on a set of training data 142. The training data 142 can include, for example, multiple sets of image frames. The sets of image frames can be captured from respective cameras mounted to an expert actor as the actor traverses a trajectory, for example as described below with reference to FIGS. 2 through 4.

In some implementations, if the user has provided consent, the training examples can be provided by the user computing device 102 (e.g., based on communications previously provided by the user of the user computing device 102). Thus, in such implementations, the model 120, 122, 124 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
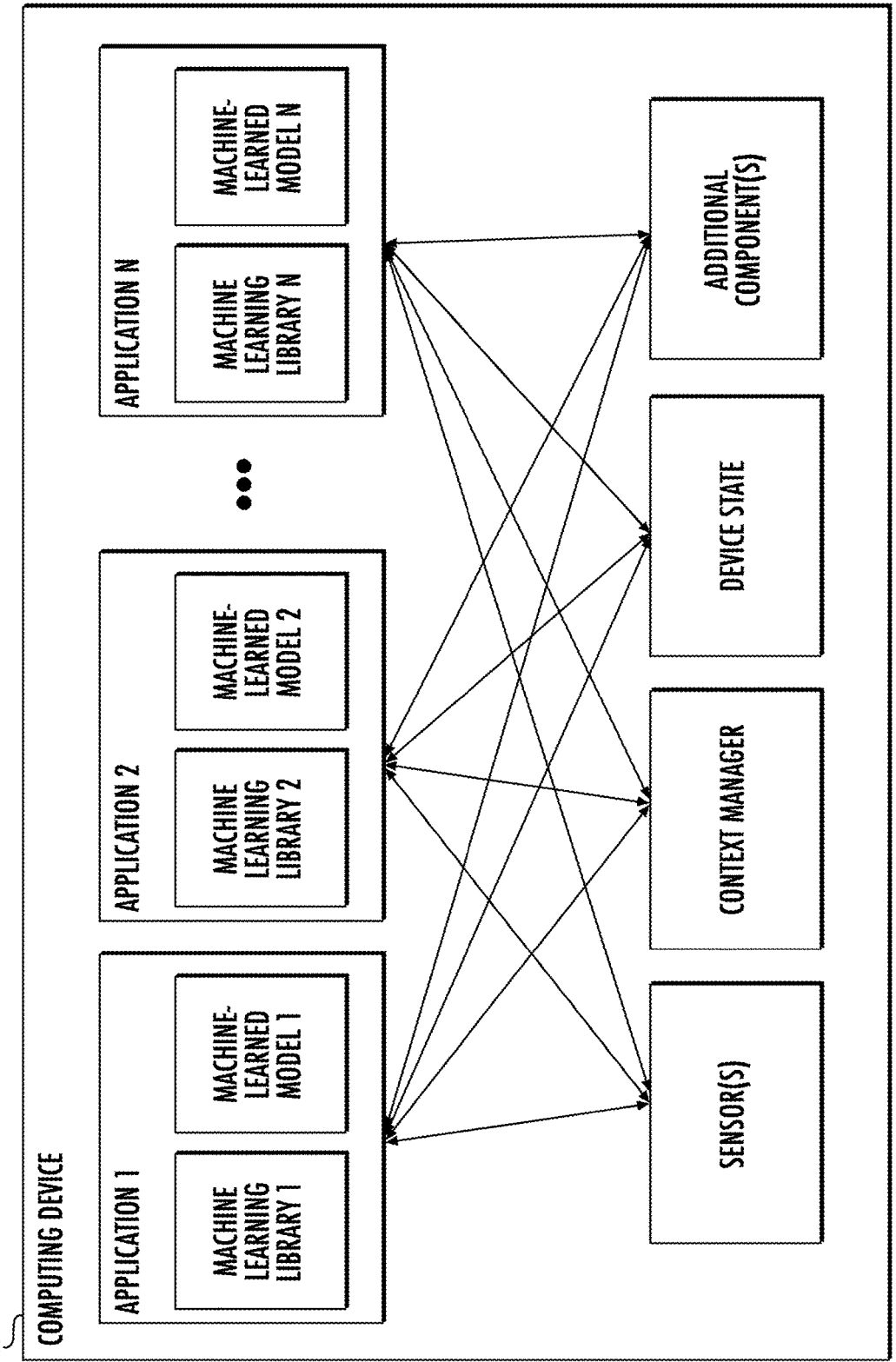
FIG. 1B depicts a block diagram of an example computing system for training a machine learned model for agent navigation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
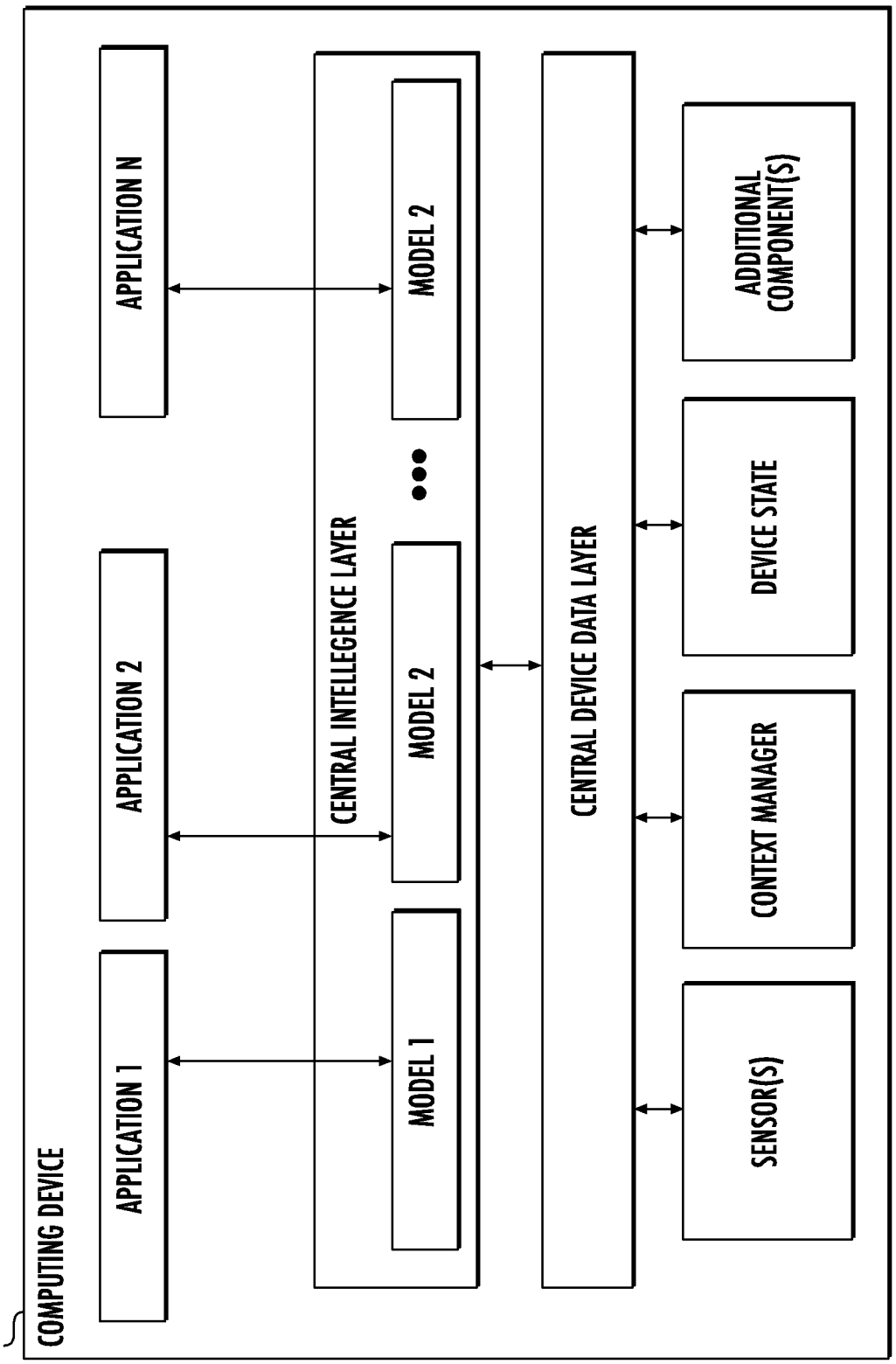
FIG. 1C depicts a block diagram of an example computing system for training a machine learned model for agent navigation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Generally, the present disclosure is directed to systems and methods for training machine learned models using imitation learning. A navigation policy can be learned for an agent based on training data collected for an expert that has different perspectives and/or different dynamics than the agent. For example, a legged robot can be trained based on training data that describes an expert demonstration by a human or human-operated robot having a different sensor perspective (e.g., camera height from a ground surface, camera orientation, etc.) than the legged robot. As another example, training data that describes an expert demonstration by a wheeled vehicle (e.g., human-operated wheeled vehicle, autonomous wheeled vehicle, etc.) can be used to train a flying vehicle (e.g., autonomous drone). Thus, the present disclosure provides for training agents using training data that has been collected by an expert having different perspectives and/or different dynamics.

According to aspects of the present disclosure, a feature disentanglement model can be configured to extract perspective-invariant state features from sequential training images collected from two or more different perspectives as an agent traverses a trajectory. Two or more cameras can be affixed to an expert and used to collect images of differing perspectives as the expert travels along a trajectory. More specifically, a first set of training images can be sequentially collected by a first camera affixed to a first agent (e.g., the expert) as the first agent traverses a trajectory. A second set of training images can be sequentially collected by a second camera affixed to the first agent as the first agent traversed the trajectory.

The computing system can be configured to use the feature disentanglement model to extract perspective-invariant state features from the first set and second set of training images. The perspective-invariant state features can describe the trajectory. For example, the perspective-invariant state features can describe respective time-based locations and/or orientations of the first actor along the trajectory with respect to an environment of the first actor.

The computing system can be configured to perform imitation learning using the perspective-invariant state features to train a second agent having a visual perspective that is different than a first visual perspective of the first set of training images and different than a second visual perspective of the second set of training images. For example, the second agent can be configured to collect image frames from a third camera that has a different perspective than each of the first and second cameras. The third camera can be affixed to the second agent such that the third camera is generally located at a height from the ground that is different than the first and second cameras. The third camera can also have a different orientation (e.g., vertical tilt) than the first and second cameras.

In some implementations, a visual navigation policy can be learned for an agent (e.g., legged robot) from an expert (e.g., human) demonstration or demonstrations. For example, a human expert can mount N cameras on the body and walk in a training environment. Each demonstration can yield a sequence of images $I_1 \ldots T^{1 \cdots N} \in \mathcal{J}$ with the perspective index (superscript) and time index (subscript).

The images with the same time indices can be assumed to be captured at the same human state (3 dimensional state space including their position in 2D and orientation).

The robot's observation space at time t can be defined by an image from the robot's perspective $I_t^{robot} \in \mathcal{I}$. The action space can include five discrete actions $a \in \mathcal{A}$: going forward, going backward, turning left, turning right and staying in place. Each action can provide high-level control over the robot while low-level motor torques on legs can be computed by a Raibert controller. Therefore, the policy π maps the robot's observation: $I_t^{robot}, I_g^{human}) \to a$ $I_t^{robot}$ and the specified goal to the action a. The task can be defined as navigating towards the goal, which can be specified by an image from the humans perspective.

Figure 2:
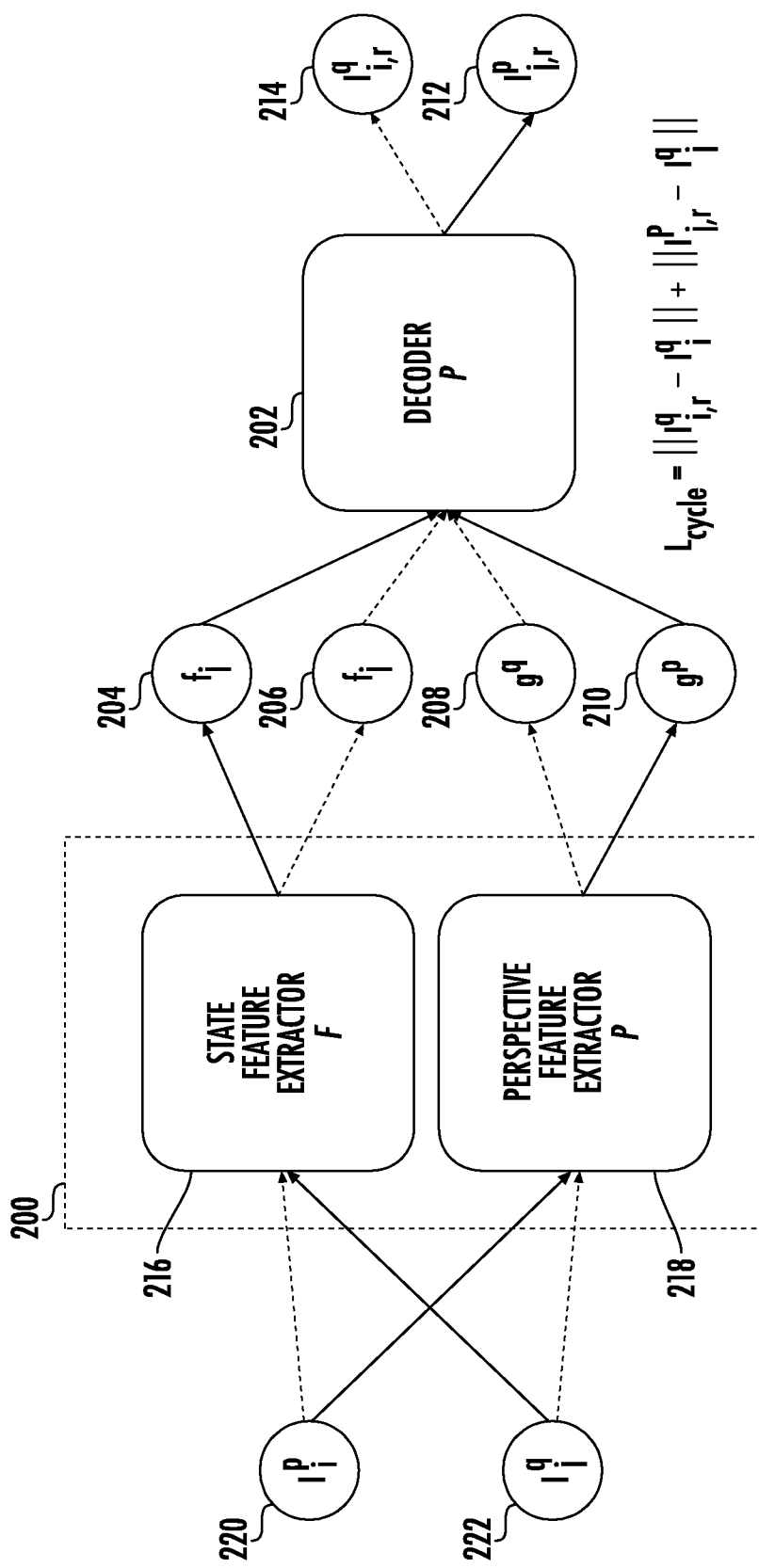
FIG. 2 depicts a block diagram of an example feature disentanglement model in combination with a decoder model in an autoencoder training configuration according to example embodiments of the present disclosure.

FIG. 2 depicts a block diagram of an example feature disentanglement model 200 in combination with a decoder model 202 in an autoencoder training configuration according to example embodiments of the present disclosure. The feature disentanglement model 200 can be trained to generate perspective-invariant state features 204, 206 that describe location information and perspective features 208, 210 that describe perspective information based on image frames describing an expert navigating an environment. For instance, the image frames can be captured by multiple cameras affixed to the expert such that the image frames having differing perspectives and/or vantage points.

The decoder model 202 can be configured to generate one or more reconstructed image 212, 214 based on the perspective-invariant state features 204, 206 and perspective features 208, 210. The feature disentanglement model 200 and/or the decoder model 202 can be trained based on a comparison of the reconstructed image(s) 212, 214 with ground truth image(s).

The feature disentanglement model 200 can include a state feature extractor model 216 and a perspective feature extractor model 218. A first image frame 220 and second image frame 222 can be input into the feature disentanglement model 200. The first image frame 220 and the second image frame 222 can be different states (indicated by i, j) and of different perspectives (indicated by p, q). The feature disentanglement model 200 can extract and separate state/perspective only information, then compose them together to generate the reconstructed image frames 212, 214 that corresponds to the input state and perspective feature. The solid lines indicate the feed-forward path to generate a first reconstructed image frame 212 ($I_{i,r}^q$) and the dashed lines indicate the feed-forward path to generate a second reconstructed image frame 214 ($I_{j,r}^p$).

Referring to the feed-forward path to generate the first reconstructed image frame 212 ($I_{i,r}^p$), the feature disentanglement model 200 can be configured to receive the first image frame 220 and the second image frame 222, and in response to receipt of the first image frame 220 and the second image frame 222, generate a state feature 204 and a perspective feature 210. The state feature 204 can be described as perspective-invariant. For example, the state feature 204 can describe a location and/or an orientation with respect to the first image frame 220 (e.g., a vantage point of the first image frame 220). The state feature(s) 204 can be free of perspective information with respect to a vantage point of the first image frame(s) 220. The location and/or orientation of the first image frames 220 can include a relative location of a vantage point of the first image frames 220 with respect to an environment.

The perspective feature 210 can describe a perspective orientation with respect to the second image frame 222. The perspective orientation can include a height and/or pitch of the vantage point of the second image frame 222. The perspective feature can be free of location information with respect to the vantage point of the second image frame 222. Thus, the feature disentanglement model 200 can be described as disentangling location information (described by the state feature 204) with perspective information (described by the perspective feature 210).

The state feature 204 and the perspective feature 210 can be received, as an output of the machine-learned feature disentanglement model 200 and input into the machine-learned decoder model 202. The machine-learned decoder model 202 can be configured to receive the state feature 204 and the perspective feature 210, and in response to receipt of the state feature 204 and perspective feature 210, output the reconstructed image frame 212. The reconstructed image frame 212 can correspond with the location of the first image frame 220 (described by the state feature 204) and perspective orientation of the second image frame 222 (described by the perspective feature 210). Thus, the machine-learned decoder model 202 can generate the reconstructed image frame 212 based on the state feature 204 and the perspective feature 210 that are output by the machine-learned feature disentanglement model 210.

The first reconstructed image frame 212 can be compared with a third image frame corresponding with the location of the first image frame 220 and the perspective orientation of the second image frame 222. The third image frame can be captured at the location and with the perspective orientation of the reconstructed image frame 212. One or more parameters of the machine-learned feature disentanglement model 200 can be adjusted based on the comparison of the reconstructed image frame 212 and the third image frame.

The third image frame from a third series of sequential image frames such that the third image frame is temporally spaced apart from the first image frame and the second image frame. The third sequential series of image frames can correspond with a third relative location with respect to the trajectory of the actor. For example, the third image frame can be captured from the first camera or second camera but at a different time than the first image frame or second frame.

Referring to the feed-forward path to generate the second reconstructed image frame 214 ($I_{j,r}^p$) (represented by dashed lines in FIG. 2), the first image frame 220 can be input into the state feature model 216 of the feature disentanglement model 200, and the second image frame 222 can be input into the perspective feature model 218 of the feature disentanglement model 200. A second state feature 206 and a second perspective feature 208 can be received as an output of the feature disentanglement model 200 (e.g., from the state feature model 216 and perspective feature model 218, respectively). The second state feature 206 and the second perspective feature 208 can be input into the decoder model 202 and the second reconstructed image frame 214 can be received as an output of the decoder model 202.

The first image frame 220 can be selected from a first series of sequential image frames that correspond with a first relative location with respect to a trajectory of an actor. For example, the first series of sequential image frames can be captured from a first camera affixed to the actor (e.g., "expert") while the actor traverses the trajectory. The second image frame 222 can be selected from a second series of sequential image frames such that the second image frame 222 is temporally aligned with the first image frame 220. The second sequential series of image frames can correspond with a second relative location with respect to the trajectory of the actor. For example, the second sequential series of image frames can be captured from a second camera affixed to the actor at a different location on the actor while the actor traverses the trajectory. In other words, the first and second image frames can be captured at the same time along the trajectory of the actor yet from different cameras (and thus with different vantage points and perspectives).

More specifically, training of the feature disentanglement model 200 and decoder model 202 can be performed as described below with reference to the following equations. The feature disentanglement model 200 can separate state information described by perspective-invariant state features 204, 206 from perspective information described by perspective features 208, 210. Such perspective-invariant state features 204, 206 can be especially useful for imitation learning between heterogeneous agents. The feature disentanglement model 200 can include the state feature extractor 216 ($F_\theta$) with parameters $\theta$. The state feature extractor 216 can be configured to extract state-only information from the visual inputs, including image frames 220, 222. The perspective feature extractor 218 ($P_\phi$) can have parameters $\phi$ and can be configured to extract perspective-only information (described by the perspective features 208, 210) from the visual input 220, 222.

The training data set (e.g., expert and/or human demonstration dataset) can be denoted as $\mathcal{D}=\{I_i^p\}_{i=1:T}^{p=1:N}$ where T is the total length and N is the total number of perspectives. For a given image input $I_i^p$, the models 216, 218 extract one part of information from the visual input:

$$f_i = F(I_i^p), g_i^p = P(I_i^p) \quad (1)$$

where $f_i \in \mathcal{F}$ and $g^p \in \mathcal{G}$ are the corresponding state features 204, 206 and perspective features 208, 210, respectively.

The decoder model 202, which can also be referred to as an image reconstructor $R_\psi$ with parameters $\psi$, can be used to train the feature disentanglement model 200. The state feature 206 ($f_i$) and the perspective feature 210 ($g^p$) can be received by the decoder model 202 as inputs. The decoder model 202 can reconstruct an image 214 corresponding to the same state specified by state feature 206 $f_i$ and the same perspective specified by perspective feature 208 $g^p$:

$$I_{i,r}^p = R_\psi(F(I_i^p), P(I_i^p)) \quad (2)$$

where the subscript r denotes reconstructed image. For any two images $I_i^p$, $I_j^q$ that correspond to different state features $f_i$, $f_j$ and different perspective features $g^p$, $g^q$, the cycle-loss function of training the feature disentanglement model 200 can be defined as:

$$L_{cycle}(I_i^p, I_j^q, \theta, \phi, \psi) = \|I_i^q - R_\psi(F_\theta(I_i^p), P_\phi(I_j^q))\| \quad (3)$$

Assuming access to temporally aligned images from multiple perspectives, the feature disentanglement model 200 can be trained to extract state related information only in the state features 204, 206 (F) and learn to extract perspective information only in the perspective features 208, 210 (P). The total loss function for training FDN can be summarized by the following equation:

$$L_{total}(\theta, \phi, \psi) = \Sigma_{\forall i,j,p,q} L_{cycle}(I_i^p, I_j^q, \theta, \phi, \psi) \quad (4)$$

The feature disentanglement model 200 can be trained by randomly sampling two images (e.g., input images frames 220, 222) from the multi-perspective data. The CycleGAN encoder can be used as the backbone of the feature extractor and convert the last layer output as a flattened d dimensional vector. K. He, X. Zhang, S. Ren, and J. Sun, "Deep residual learning for image recognition," in Proceedings of the IEEE conference on computer vision and pattern recognition, 2016, pp. 770-778. The decoder model 202 can be based on the CycleGAN decoder.

In one example embodiment, the feature disentanglement model 200 can include multiple convolutional layers (e.g., four convolutional layers) followed by multiple residual layers (e.g., four residual layers). Instance normalization can be used after each convolutional layer. The decoder model 202 can include one or more deconvolutional layers (e.g., two deconvolutional layers) followed by a convolutional layer and an upsampling layer. The Swish activation function can be used through the models 200, 202 as needed.

Figure 3:
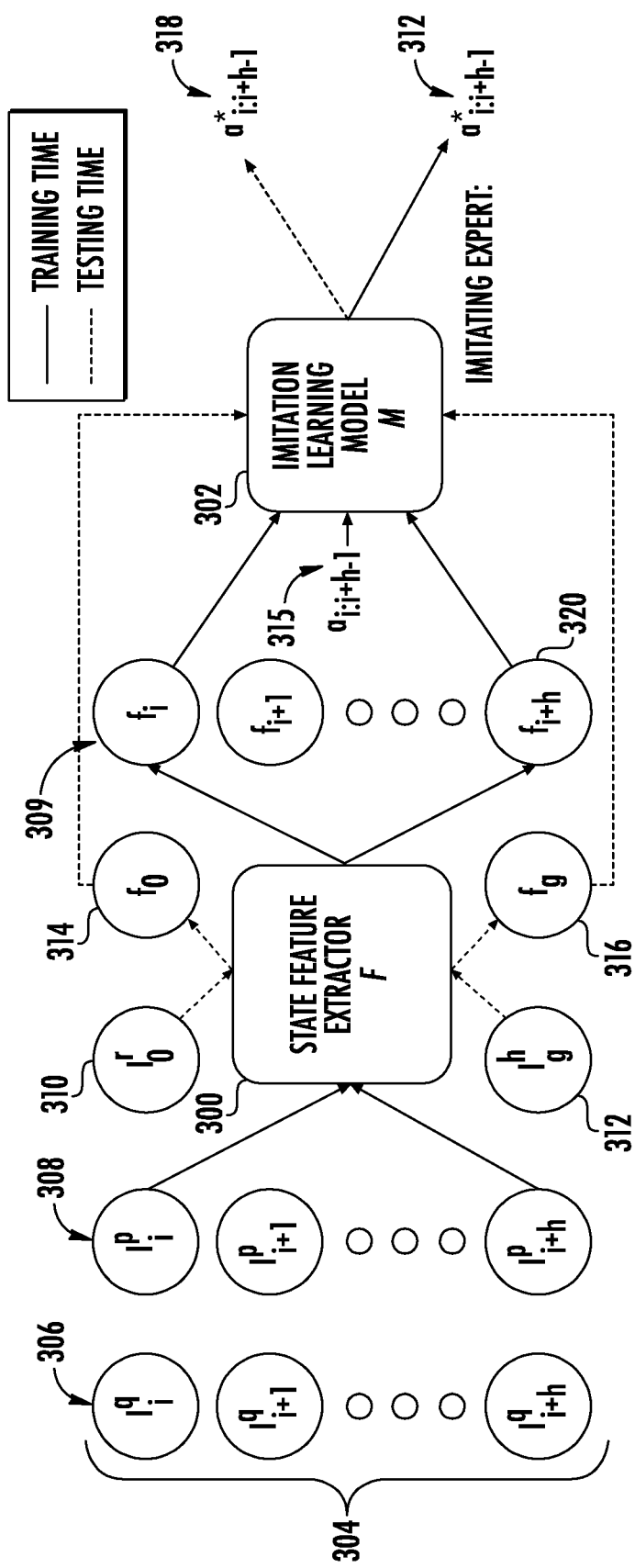
FIG. 3 illustrates an example feature disentanglement model and an imitation model in a training configuration according to aspects of the present disclosure.

FIG. 3 illustrates an example feature disentanglement model 300 and an imitation model 302 in a training configuration according to aspects of the present disclosure. In this configuration, the feature disentanglement model 300 can include a state feature extractor, for example as described with reference to the state feature extractor 216 of FIG. 2. The state feature extractor 216 can be trained, in a first training stage, in an autoencoder configuration as described above with reference to FIG. 2. Subsequently the state feature extractor 216 can be trained, in a second training stage, for example as described herein with reference to the feature disentanglement model 300 of FIG. 3.

Referring to FIG. 3, training is represented by solid lines, and inference (e.g., testing) is represented by dashed lines. During training, the method can include inputting the first sequential series 306 of image frames and the second sequential series of image frames 308 into the machine-learned feature disentanglement model 300 (e.g., including a state feature model for example as described with reference to the state feature model 216 of FIG. 2). The first sequential series of image frames 306 can correspond with a first relative location (e.g., vantage point, affixed location on the expert, etc.) with respect to a trajectory of an actor. The second sequential series of image frames 308 can correspond with a second relative location (e.g., vantage point, affixed location on the expert, etc.) with respect to the trajectory of the actor. The method can include receiving, as an output of the machine-learned feature disentanglement model 300, a plurality of state features 309 that describe respective locations with respect to trajectory of the actor. For instance, the plurality of state features 309 can describe the trajectory with respect to an environment of the actor.

In some implementations, the imitation learning model 302 can be trained to generate a navigation policy (e.g., including an action sequence 312) for an agent in response to receiving input data, such as the state features 309 describing locations within an environment. The imitation learning model 302 can be trained using the state features 309 output by the feature disentanglement model 300 in response to receiving the training image frames 306, 308 having a perspective that is different than the perspective of the agent. The action sequence 312 can describe actions for the agent to navigate the environment along a trajectory previously navigated by the expert (as described by the training image frames 306, 308).

For example, the method can include inputting the plurality of state features 309 into the machine-learned imitation model 302. The machine-learned imitation model 302 can be configured to receive the plurality of state features 309, and in response to receipt of the plurality of state features 309, output the action sequence 312 that describes a series of actions for another actor to follow the trajectory of the actor (e.g., expert). The method can include receiving, as an output of the machine-learned feature disentanglement model 300, a plurality of state features 309 that describe respective locations with respect to trajectory of the actor.

The machine-learned imitation model 302 can be trained based on a comparison of the action sequence 312 output by the machine-learned imitation model 302 with a ground truth action sequence of the actor. The ground truth action sequence of the actor can correspond with instructions followed by the actor (e.g., expert) to traverse the trajectory. For instance, the ground truth action sequence can include instructions such as forward, turn left, turn right, stop, and so forth. The method can include adjusting one or more parameters of the machine-learned imitation model 302 based on the action sequence output by the machine-learned imitation model with the ground truth action sequence. Thus, the machine-learned imitation model can be trained to generate the action sequence 312 for another actor to follow to traverse the trajectory of the expert More specifically and with reference to example equations and relationships, the feature disentanglement model 300 can receive multi-view expert demonstration data 304 including the first series 306 of sequential image frames and second series 308 of sequential image frames. The expert demonstration data 304 can include training image frames from multiple angles along a trajectory. For example, the first series 306 of sequential image frames can be captured from a first camera affixed to an expert actor (e.g., a human, vehicle, robot, etc.) while the actor traverses the trajectory. The second sequential series 308 of image frames can be captured from a second camera affixed to the export actor at a different location on the actor while the actor traverses the trajectory. The expert demonstrations data 304 (e.g., human demonstration data) can include images from multiple perspectives (indicated by p and q). This expert demonstration data 304 can be processed into the sequence of the features 309 $\{f_0, f_1, \ldots, f_n\}$ using the trained feature disentanglement model 300.

The imitation learning model 302 can receive the preprocessed features of demonstration data 309 ($f_i, f_{i+1} \ldots f_{i+h}$) and learn to imitate the expert navigation policy or expert expert action sequence ($a_{i:i+h-1}^{expert}$) (e.g., human action sequence). The imitation learning model 302 can be trained in the latent feature space $\mathcal{F}$.

To generate ground truth expert action sequences, a series of robot-compatible actions $\{a_0, a_1, \ldots, a_{n-1}\}$ can be labeled using an inverse dynamics model or using a developed GUI to manually label actions. The inverse dynamics model (IDM) can receive state feature extractor processed images that are temporally consecutive. The inverse dynamics model can predict each agent action that completes the transition. For instance, to obtain one episode of robot data for training IDM, a robot can be randomly started and walked in an environment until collision or the number of steps exceeds 30. Multiple episodes can be collected using robot random walk data.

The imitation learning model 302 (M) can receive a starting action sequence 315 ($a_{0:h} = \{a_0, a_1, \ldots, a_h\}$), where h+1 is the prediction horizon of the model and output the action sequence 312. The starting action sequence 315 is labeled as $a_{i:i+h-1}$ in FIG. 3. The starting action sequence 315 can be randomly initialized. The imitation learning model 302 (M) can predict future states' feature representations $f_1, \ldots, f_{h+1}$. The action sequence 312 can be updated using gradient descent on the following plan loss:

$$a_{0:h}^* = \text{argmin}_{a_{0:h}} L_{plan} \qquad (5)$$

$$= \text{argmin}_{a_{0:h}} L_{Huber}(M(F(I_0^{agent}), a_{0:h}), F(I_g^{expert}))$$

The action sequence 312 can be updated to minimize the difference between the predicted final future state feature $M(F(I_0^{agent}), a_{0:h})$ and the given goal state feature $F(I_g^{expert})$. The superscript agent is used to explicitly point out that $I_0^{agent}$ is from the agent's perspective (e.g., robot's perspective) while the superscript expert means $I_g^{expert}$ is from the expert's perspective (e.g., human expert's perspective). Huber loss can be used to measure a difference between the predicted feature and goal feature. Parameters of the imitation learning model 302 can be adjusted based on a loss function that describes a comparison between the ground truth expert action sequence $a_{0:h}^{expert}$ (e.g., navigation policy) and an action sequence 312 output by the imitation learning model 302. For example, a loss function can be defined as follows, where $a^*_{i:i+h-1}$ represents the expert action sequence 312 output by the imitation learning model 302:

$$M^* = \text{arg min}_M \|a^*_{0:h} - a_{0:h}^{expert}\| \qquad (6)$$

The loss function above can be or include a cross entropy loss when the action space is discrete. Once the model M is trained using Eqs. (5) and (6), the policy $\pi$ can be implicitly defined. At each time step, the policy can replan the entire action sequence and only executes the first action. When training the imitation learning model 302, the prediction horizon can change, and it depends on the number of expert steps between the start and goal state, a mask can be applied on Equation 6 to only imitate the corresponding action sequence.

During inference (e.g., testing), which is illustrated by the dash lines in FIG. 3, a start image 310 ($I_0'$) and a goal image 312 ($I_g^h$) can be input into the trained feature disentanglement model 300. The feature disentanglement model 300 can output a start feature 314 ($f_0$) and a goal feature 316 ($f_g$). The start feature 314 can represent a current location or state of the agent. The goal feature 316 can represent a goal location or state for the agent. The imitation learning model 302 can receive the start feature 314 and goal feature 316 and optimize an action sequence 318 ($a^*_{i:i+h-1}$) to minimize the difference between a final state feature 320 and the goal state feature 316.

Figure 4:
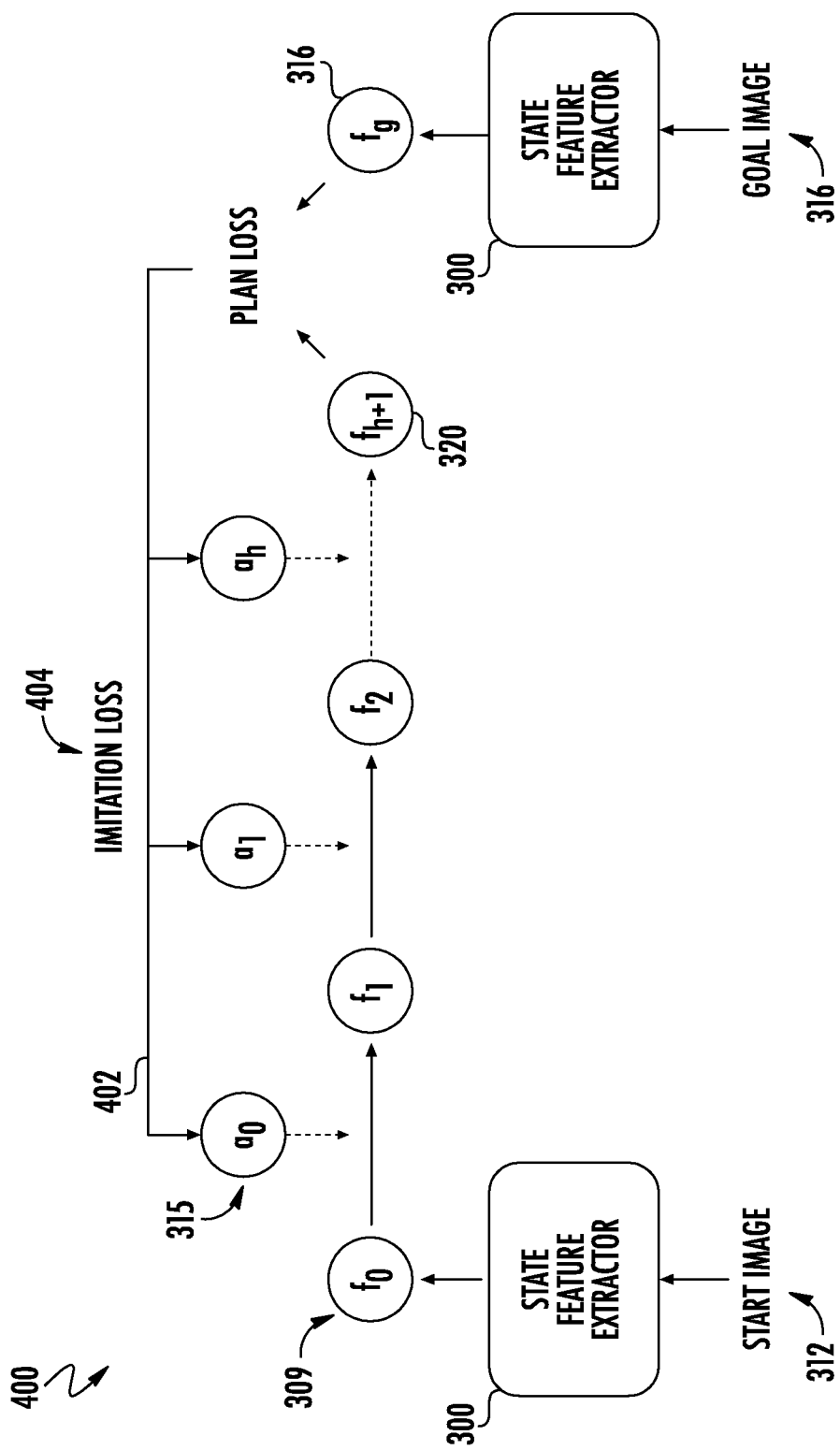
FIG. 4 is a diagram of an imitation learning model according to aspects of the present disclosure.

FIG. 4 is a diagram of an imitation learning model 400 according to aspects of the present disclosure. The imitation learning model 400 can generally correspond with the imitation learning model 302 of FIG. 3. The imitation learning model 400 can receive an initial action sequence 315 ($a_{0:h}$) and predicts future state latent representations. The imitation learning model 400 can optimize the action sequence 315 to minimize the difference between the predicted final state 320 ($f_{h+1}$) and the goal state feature representation 316 ($f_g$). A gradient flow can be represented by line 402. Model parameters can be updated by minimizing the imitation loss 404. The imitation loss can be defined as follows:

$$a^*_{0:h} = a_{0:h} - \nabla_{a_{0:h}} L_{plan} \rightarrow L_{imitation} = \|a^*_{0:h} - a_{0:h}^{expert}\| \qquad (7)$$

where the Plan Loss, $L_{plan}$, is defined as $L_{plan} = \|f_{h+1} - f_g\|$.

Example Methods

Figure 5:
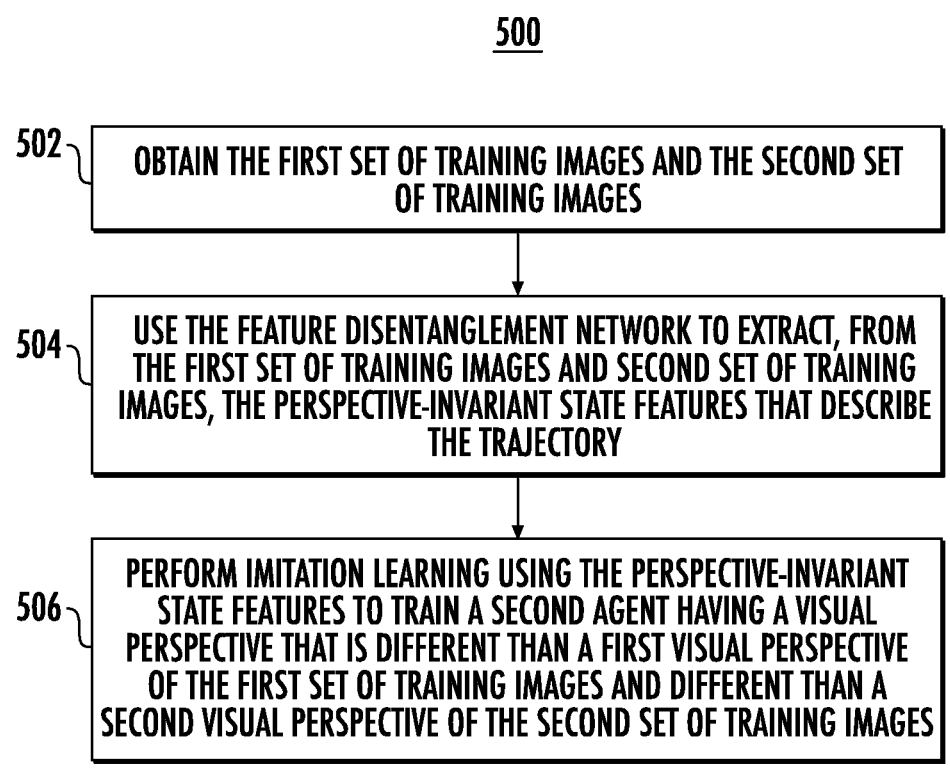
FIG. 5 depicts a flow chart diagram of an example method for training a machine learned model for agent navigation according to example embodiments of the present disclosure.

FIG. 5 depicts a flow chart diagram of an example method for training a machine learned model for agent navigation according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain the first set of training images and the second set of training images. The first set of training images can be sequentially collected by a first camera affixed to a first agent (e.g., expert) as the first agent traversed a trajectory. The second set of training images can be sequentially collected by a second camera affixed to the first agent as the first agent traversed the trajectory.

At 504, the computing system can use the feature disentanglement model to extract, from the first set of training images and second set of training images, the perspective-invariant state features that describe the trajectory.

At 506, the computing system performing imitation learning using the perspective-invariant state features to train a second agent having a visual perspective that is different than a first visual perspective of the first set of training images and different than a second visual perspective of the second set of training images.

Figure 6:
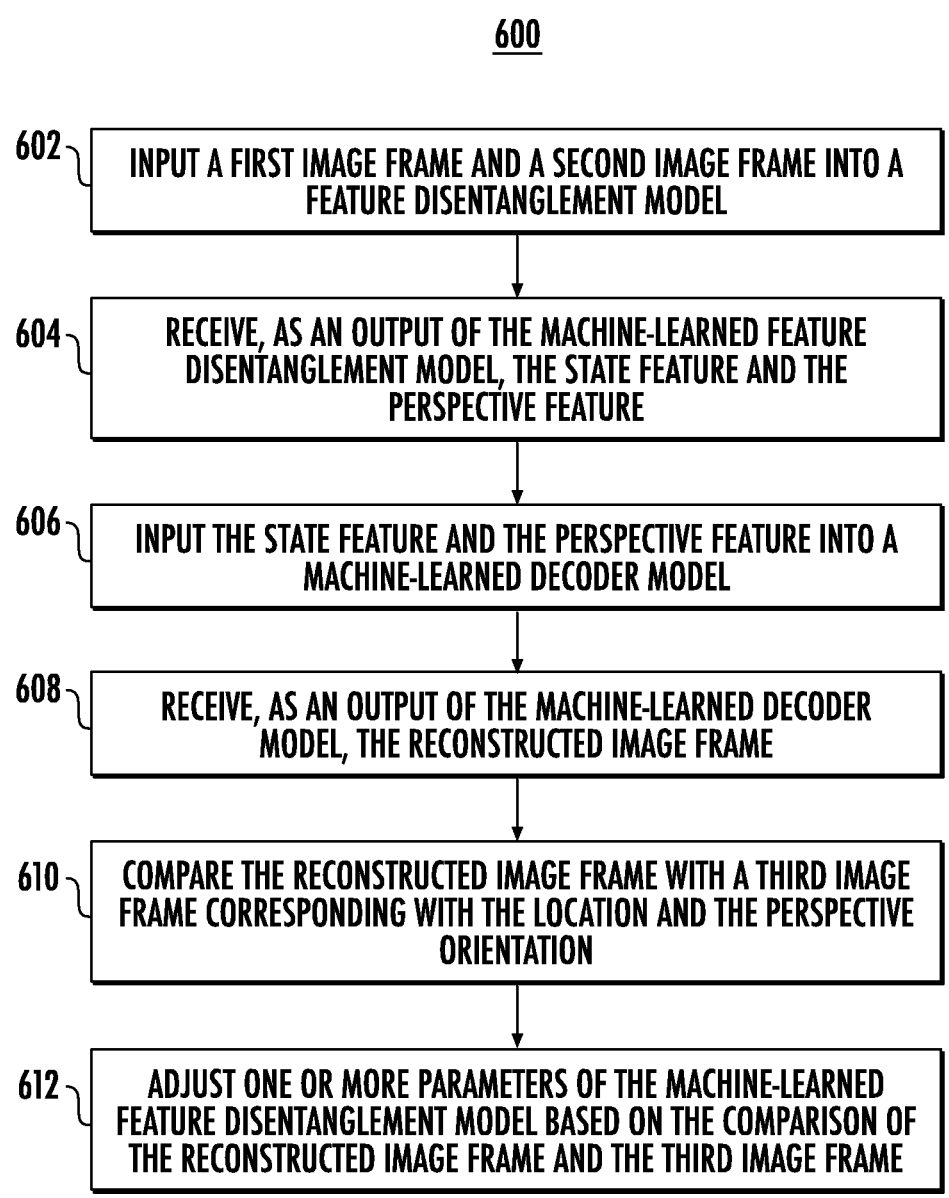
FIG. 6 depicts a flow chart diagram of an example method for training a machine learned model for agent navigation according to example embodiments of the present disclosure.

FIG. 6 depicts a flow chart diagram of an example method for training a machine learned model for agent navigation according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can input a first image frame and a second image frame into a feature disentanglement model. The feature disentanglement model can be configured to receive the first image frame and the second image frame, and in response to receipt of the first image frame and the second image frame, generate a state feature and a perspective feature. The state feature can describe a location with respect to the first image frame. The perspective feature can describe a perspective orientation with respect to the second image frame.

At 604, the computing system can receive, as an output of the machine-learned feature disentanglement model, the state feature and the perspective feature.

At 606, the computing system can input the state feature and the perspective feature into a machine-learned decoder model. The machine-learned decoder model can be configured to receive the state feature and the perspective feature, and in response to receipt of the state feature and perspective feature, output a reconstructed image frame. The reconstructed image frame can correspond to the location with respect to the first image frame that is described by the state feature and correspond to the perspective orientation with respect to the second image frame that is described by the perspective feature.

At 608, the computing system can compare the reconstructed image frame with a third image frame corresponding with the location and the perspective orientation. For example, one or more losses from one or more the loss functions can be iteratively reduced (e.g., using gradient descent).

At 610, the computing system can adjust one or more parameters of the machine-learned feature disentanglement model based on the comparison of the reconstructed image frame and the third image frame.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training one or more machine-learned models, the method comprising:
    inputting, by one or more computing devices, a first image frame and a second image frame into a feature disentanglement model that is configured to
        receive the first image frame and the second image frame, and
        in response to receipt of the first image frame and the second image frame, generate a state feature and a perspective feature,
            the state feature describing a location with respect to the first image frame,
            the perspective feature describing a perspective orientation with respect to the second image frame;
    receiving, by the one or more computing devices and as an output of the machine-learned feature disentanglement model, the state feature and the perspective feature;
    inputting, by the one or more computing device, the state feature and the perspective feature into a machine-learned decoder model that is configured to
        receive the state feature and the perspective feature, and
        in response to receipt of the state feature and perspective feature, output a reconstructed image frame corresponding to the location with respect to the first image frame that is described by the state feature and corresponding to the perspective orientation with respect to the second image frame that is described by the perspective feature;
    receiving, by the one or more computing devices and as an output of the machine-learned decoder model, the reconstructed image frame;

comparing, by the one or more computing device, the reconstructed image frame with a third image frame corresponding with the location and the perspective orientation; and adjusting, by the one or more computing device, one or more parameters of the machine-learned feature disentanglement model based on the comparison of the reconstructed image frame and the third image frame.

2. The computer-implemented method of claim 1, wherein the location describes a relative location and an orientation of an actor with respect to an environment at a vantage point of the first image frame.

3. The computer-implemented method of claim 1, wherein the perspective orientation describes at least one of a height or a pitch angle of a vantage point of the second image frame.

4. The computer-implemented method of claim 1, wherein inputting the plurality of image frames into the machine-learned feature disentanglement model comprises:
inputting the first image frame into a state feature extractor model of the machine-learned feature disentanglement model; and
inputting the second image into a perspective feature extractor model of the machine-learned feature disentanglement model.

5. The computer-implemented method of claim 1, further comprising:
selecting the first image frame from a first series of sequential image frames, the first sequential series of image frames corresponding with a first relative location with respect to a trajectory of an actor; and
selecting the second image frame from a second series of sequential image frames such that the second image frame is temporally aligned with the first image frame, the second sequential series of image frames corresponding with a second relative location with respect to the trajectory of the actor.

6. The computer-implemented method of claim 5, further comprising selecting the third image frame from a third series of sequential image frames such that the third image frame is temporally spaced apart from the first image frame and the second image frame, the third sequential series of image frames corresponding with a third relative location with respect to the trajectory of the actor.

7. The computer-implemented method of claim 1, further comprising:
inputting a first sequential series of image frames and a second sequential series of image frames into the machine-learned feature disentanglement model, the first sequential series of image frames corresponding with a first relative location with respect to a trajectory of an actor, and the second sequential series of image frames corresponding with a second relative location with respect to the trajectory of the actor; and
receiving, as an output of the machine-learned feature disentanglement model, a plurality of state features that describe respective locations with respect to trajectory of the actor.

8. The computer-implemented method of claim 7, further comprising inputting the plurality of state features into a machine-learned imitation model that is configured to receive the plurality of state features, and in response to receipt of the plurality of state features, output an action sequence that describes a series of actions for another actor to follow the trajectory of the actor.

9. The computer-implemented method of claim 8, further comprising:
comparing the action sequence output by the machine-learned imitation model with a ground truth action sequence of the actor; and
adjusting one or more parameters of the machine-learned imitation model based on the action sequence output by the machine-learned imitation model with the ground truth action sequence.

10. A computing system for training one or more machine-learned models, the computing system comprising:
a feature disentanglement model that is configured to receive a first image frame and a second image frame, and in response to receipt of the first image frame and the second image frame, generate a state feature and a perspective feature, the state feature describing a location with respect to the first image frame, the perspective feature describing a perspective orientation with respect to the second image frame;
at least one processor;
at least one tangible, non-transitory computer-readable medium that stores instructions that, when executed by the at least one processor, cause the at least one processor to perform operations, the operations comprising:
inputting the first image frame and the second image frame into the feature disentanglement model;
receiving, as an output of the machine-learned feature disentanglement model, the state feature and the perspective feature;
inputting the state feature and the perspective feature into the machine-learned decoder model that is configured to receive the state feature and the perspective feature, and in response to receipt of the state feature and perspective feature, output a reconstructed image frame corresponding to the location with respect to the first image frame that is described by the state feature and corresponding to the perspective orientation with respect to the second image frame that is described by the perspective feature;
receiving, as an output of the machine-learned decoder model, the reconstructed image frame;
comparing, by the one or more computing device, the reconstructed image frame with a third image frame corresponding with the location and the perspective orientation; and
adjusting, by the one or more computing device, one or more parameters of the machine-learned feature disentanglement model based on the comparison of the reconstructed image frame and the third image frame.

11. The computing system of claim 10, wherein the location describes a relative location and an orientation of an actor with respect to an environment at a vantage point of the first image frame.

12. The computing system of claim 10, wherein the perspective orientation describes at least one of a height or a pitch angle of a vantage point of the second image frame.

13. The computing system of claim 10, wherein the machine-learned feature disentanglement model comprises a state feature extractor model and a perspective feature extractor model, and wherein inputting the plurality of image frames into the machine-learned feature disentanglement model comprises:
inputting the first image frame into the state feature extractor model of the machine-learned feature disentanglement model; and inputting the second image into the perspective feature extractor model of the machine-learned feature disentanglement model.

14. The computing system of claim 10, wherein the operations further comprise:
selecting the first image frame from a first series of sequential image frames, the first sequential series of image frames corresponding with a first relative location with respect to a trajectory of an actor;
selecting the second image frame from a second series of sequential image frames such that the second image frame is temporally aligned with the first image frame, the second sequential series of image frames corresponding with a second relative location with respect to the trajectory of the actor; and
selecting the third image frame from a third series of sequential image frames such that the third image frame is temporally spaced apart from the first image frame and the second image frame, the third sequential series of image frames corresponding with a third relative location with respect to the trajectory of the actor.

15. The computing system of claim 10, wherein the operations further comprise:
inputting a first sequential series of image frames and a second sequential series of image frames into the machine-learned feature disentanglement model, the first sequential series of image frames corresponding with a first relative location with respect to a trajectory of an actor, and the second sequential series of image frames corresponding with a second relative location with respect to the trajectory of the actor;
receiving, as an output of the machine-learned feature disentanglement model, a plurality of state features that describe respective locations with respect to trajectory of the actor.

16. The computing system of claim 10, wherein the operations further comprise inputting the plurality of state features into a machine-learned imitation model that is configured to receive the plurality of state features, and in response to receipt of the plurality of state features, output an action sequence that describes a series of actions for another actor to follow the trajectory of the actor.

17. A computing system comprising:
a machine-learned state feature extractor model that is configured to
receive an initial image frame and a goal image frame, and,
in response to receipt of the initial image frame and the goal image frame, generate an initial state feature and a goal state feature,
the initial state feature describing an initial location at an initial vantage point of the initial image frame with respect to an environment, and
the goal state feature describing a goal location at a goal vantage point of the goal image frame with respect to the environment;
at least one processor;
at least one tangible, non-transitory computer-readable medium that stores instructions that, when executed by the at least one processor, cause the at least one processor to perform operations, the operations comprising:
inputting the initial image frame and the goal image frame into the machine-learned state feature extractor model;
receiving, as an output of the machine-learned state feature extractor model, the initial state feature that describes the initial location and the goal state feature that describes the goal location; and
determining an action sequence describing a series of actions for an actor to traverse from the initial location to the goal location.

18. The computing system of claim 17, wherein the machine-learned state feature extractor model has been trained in combination with:
a machine-learned perspective feature extractor model that is trained to receive a training image frame and, in response to receipt of the training image frame, generate perspective information that describes a perspective orientation with respect to the training image frame; and
a machine-learned decoder model that is configured to receive a state feature output by machine-learned state feature extractor model and the perspective feature, and in response to receipt of the state feature and perspective feature, output a reconstructed image frame corresponding to the location and the perspective orientation.

19. The computing system of claim 17, further comprising:
a machine-learned imitation learning model that is configured to
receive the initial state feature that describes the initial location and the goal state feature that describes the goal location and,
in response to receipt of the initial state feature and the goal state feature, generate the action sequence, and
wherein the operations further comprise:
inputting the initial state feature and the goal state feature into the machine-learned imitation learning model; and
receiving, as an output of the machine-learned imitation learning model, the action sequence.

20. A computing system comprising:
a feature disentanglement model configured to extract perspective-invariant state features from on a first set of training images having a first perspective and a second set of training images having a second perspective;
at least one processor;
at least one tangible, non-transitory computer-readable medium that stores instructions that, when executed by the at least one processor, cause the at least one processor to perform operations, the operations comprising:
obtaining the first set of training images and the second set of training images, wherein the first set of training images was sequentially collected by a first camera affixed to a first agent as the first agent traversed a trajectory, and wherein the second set of training images was sequentially collected by a second camera affixed to the first agent as the first agent traversed the trajectory;
using the feature disentanglement model to extract, from the first set of training images and second set of training images, the perspective-invariant state features that describe the trajectory; and
performing imitation learning using the perspective-invariant state features to train a second agent having a visual perspective that is different than a first visual perspective of the first set of training images and different than a second visual perspective of the second set of training images.

21. The computing system of claim 17, wherein the goal image frame was captured by an expert that has at least one of
a different perspective than the agent or
different dynamics than the agent.

22. The computing system of claim 17, wherein the goal state feature is indicative of an orientation with respect to the initial state feature.

23. The computing system of claim 17, wherein the initial state feature represents an initial state of the agent and the goal state feature represents a goal state of the agent.

24. The computing system of claim 17, wherein the agent is associated with a task comprising navigating toward the goal location.

* * * * *